US012769521B2

(12) United States Patent
Khadivi et al.

(10) Patent No.: US 12,769,521 B2
(45) Date of Patent: Oct. 20, 2026

(54) MODIFIED WEBPAGE CODE GENERATION FOR CUSTOMIZED HOMEPAGES

(71) Applicant: eBay Inc., San Jose, CA (US)

(72) Inventors: Shahram Khadivi, Herzogenrath (DE); Christian Klaus Herold, Aachen (DE)

(73) Assignee: eBay Inc., San Jose, CA (US)

( * ) Notice: Subject to any disclaimer, the term of this patent is extended or adjusted under 35 U.S.C. 154(b) by 222 days.

(21) Appl. No.: 18/533,604

(22) Filed: Dec. 8, 2023

(65) Prior Publication Data

US 2025/0190183 A1 Jun. 12, 2025

(51) Int. Cl.
*G06F 8/35* (2018.01)
*G06F 11/362* (2025.01)

(52) U.S. Cl.
CPC ............ *G06F 8/35* (2013.01); *G06F 11/3624* (2013.01)

(58) Field of Classification Search
CPC .... G06F 8/35; G06F 11/3624; G06F 16/9577; G06F 16/986
See application file for complete search history.

(56) References Cited

U.S. PATENT DOCUMENTS

| | | | | |
|---|---|---|---|---|
| 10,726,091 | B2 * | 7/2020 | Isager | G06F 16/958 |
| 2021/0342522 | A1 * | 11/2021 | Khorana | H04L 67/561 |
| 2023/0032425 | A1 | 2/2023 | Ekron | |

OTHER PUBLICATIONS

Extended European Search Report received for European Application No. 24216555.3, mailed on Mar. 28, 2025, 9 pages.

* cited by examiner

*Primary Examiner* — Hanh Thi-Minh Bui
(74) *Attorney, Agent, or Firm* — Shook Hardy & Bacon L.L.P.

(57) ABSTRACT

Some aspects relate to technologies for using a generative model to customize homepages. In accordance with some aspects, webpage code for a home page is accessed. Additionally, a prompt is received to modify the homepage to provide a customized homepage. A generative model is caused to generate modified webpage code using the prompt and the webpage code. The modified webpage code is transmitted, over a network to a client device, for rendering the customized homepage on the client device.

17 Claims, 8 Drawing Sheets

MODIFIED WEBPAGE CODE GENERATION FOR CUSTOMIZED HOMEPAGES

BACKGROUND

Many websites support homepages that present content personalized to users. A homepage often serves as a central hub of the website for the user to access various features, tools, or information related to their account. After a user logs into their account at a website, a homepage could display personalized content, such as account details, recent activities, or other information. A homepage can also include various features, such as navigation links to different sections of the website. The design and content of a homepage depend on the nature of the website and the services it provides. For example, social media platforms could show a user's feed and notifications on their homepage, while an e-commerce site could display personalized product recommendations and order history.

SUMMARY

Some aspects of the present technology relate to, among other things, customizing homepages using a generative model to modify webpage code for the homepages. In accordance with some aspects, webpage code for a user's homepage is accessed. Additionally, a prompt for customizing the homepage is received. The prompt may be text input by the user or determined based on a homepage customization suggestion presented to and selected by the user. The prompt and webpage code are provided as input to the generative model, which generates modified webpage code by modifying the webpage code in accordance with the prompt. The modified webpage code is transmitted to the user device for rendering the customized homepage on the user device.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Overview

Figure 1:
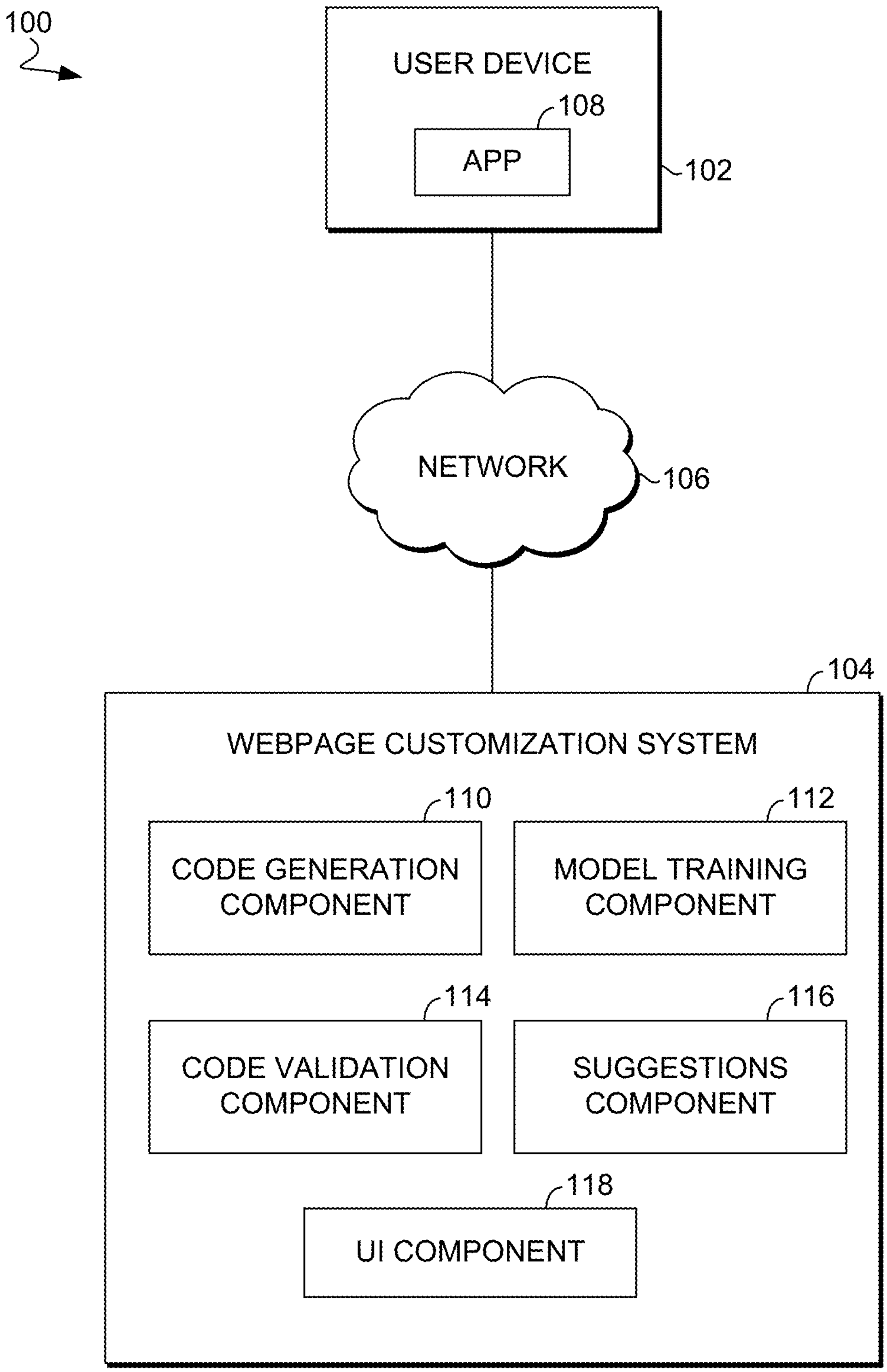
FIG. 1 is a block diagram illustrating an exemplary system in accordance with some implementations of the present disclosure.

Homepages provided by many websites allow users to view personalized content. However, there are limitations to the content and features (e.g., links) that can be viewed and how they are configured on the homepages. In particular, while the content presented on a homepage is personalized to a user, the structure of the homepage, including what type of content and features it includes, often is not personalized. For instance, a homepage for an e-commerce site could include sections of content that present recent orders, followed by recently viewed items, followed by recommended items. When each user accesses their homepage, these three sections are presented in that order. While the content of each of these three sections is personalized to each user, the overall structure of the homepage is the same for all users. In particular, the homepage provided for each user would present their recent orders, followed by their recently viewed items, followed by their recommended items.

Some websites support limited customization of homepages. For instance, some websites allow users to customize what sections of content are presented on a homepage and in what order. However, how to customize the homepages on these websites is often not intuitive to users, resulting in many users not customizing their homepages. Furthermore, the customizations that can be made to a homepage are pre-configured by the website. This limits the extent to which users can configure their homepages, including what content and website features they want included on the homepage and the format (e.g., order and appearance) of the content and features on the homepage.

Aspects of the technology described herein improve the functioning of the computer itself in light of these shortcomings in webpage technologies by providing a solution that allows for flexible, open-ended homepage customization using a generative model to modify webpage code for homepages.

In accordance with some aspects of the technology described herein, when a user views their homepage on a user device, one or more user interface elements are presented that allow the user to customize their homepage. The user interface elements could be, for instance, a text box that allows a user to enter a prompt for customizing the webpage, or user-selectable suggestions for homepage customizations. Based on user input, a prompt is provided with the webpage code for the homepage to a generative model. Using the prompt and the webpage code, the generative model generates modified webpage code by modifying the input webpage code in accordance with the prompt. The modified webpage code is then provided to the user device for rendering the customized homepage on the user device.

In some aspects, the homepage customization process can be iterative, in which the webpage code is modified over a number of iterations. At each iteration, user input is received causing a prompt to be provided to the generative model, the generative model modifies the webpage code given the prompt, and the modified webpage code is provided to the user device for rendering. This allows a number of different homepage customizations to be made and viewed by the user.

In some aspects, a validation process is performed on modified webpage code generated by the generative model. The validation process determines whether the modified webpage code provided by the generative model includes any errors (e.g., syntax errors, runtime errors, logical errors, semantic errors, etc.). If an error is detected, the system generates a corrective prompt and provides the corrective prompt to the generative model. Using the corrective prompt (and either the initial webpage code or the modified webpage code), the generative model generates new modified webpage code to address the error.

In further aspects, the system provides homepage customization suggestions for presentation to users to facilitate the customization process. The homepage customization suggestions are determined, in some configurations, by analyzing historical customization data regarding what customizations users have made using the system. The historical customization data can include, for instance, historical prompts entered by users to customize their webpages. When a user selects a given homepage customization suggestion, a prompt is determined for the selected homepage customization suggestion, and that prompt is provided as input to the generative model to modify the webpage code and provide a customized homepage to the user. In this way, the user is given ideas on how to customize their homepage. Additionally, the user does not need to enter a prompt, but instead a prompt optimized for the selected homepage customization can be used.

Aspects of the technology described herein provide a number of improvements over existing homepage technologies. For instance, the use of a generative model to modify webpage code for homepages allows for open-ended customization of the homepages in which users are not limited to pre-configured changes that are built into a webpage. Instead, the technology allows for flexible customization of: what content and features are included on their homepages, how the content and features are ordered or otherwise located on their homepages, and/or the appearance of the homepage (e.g., colors, fonts, etc.). Additionally, the use of a generative model to customize homepages is more intuitive to users. A user can simply enter text for a prompt or otherwise select a homepage customization suggestion to specify a desired customization, and the user's homepage is customized in accordance with the user's intent by generating modified webpage code to provide the customized homepage.

Example System for Generating Modified Webpage Code for Customized Homepages

With reference now to the drawings, FIG. 1 is a block diagram illustrating an exemplary system 100 for generating customized webpage code for a homepage at a website in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and a webpage customization system 104. Each of the user device 102 and the webpage customization system 104 shown in FIG. 1 can comprise one or more computer devices, such as the computing device 800 of FIG. 8, discussed below. As shown in FIG. 1, the user device 102 and the webpage customization system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of user devices and servers can be employed within the system 100 within the scope of the present technology. Each can comprise a single device or multiple devices cooperating in a distributed environment. For instance, the webpage customization system 104 could be provided by multiple server devices collectively providing the functionality of the webpage customization system 104 as described herein. Additionally, other components not shown can also be included within the network environment.

The user device 102 can be a client device on the client-side of operating environment 100, while the webpage customization system 104 can be on the server-side of operating environment 100. The webpage customization system 104 can comprise server-side software designed to work in conjunction with client-side software on the user device 102 so as to implement any combination of the features and functionalities discussed in the present disclosure. For instance, the user device 102 can include an application 108 for interacting with the webpage customization system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the webpage customization system 104 remain as separate entities. While the operating environment 100 illustrates a configuration in a networked environment with a separate user device and webpage customization system, it should be understood that other configurations can be employed in which components are combined. For instance, in some configurations, a user device can provide some capabilities described in conjunction with the webpage customization system.

The user device 102 can comprise any type of computing device capable of use by a user. For example, in one aspect, the user device can be the type of computing device 800 described in relation to FIG. 8 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user can be associated with the user device 102 and can interact with the webpage customization system 104 via the user device 102.

The webpage customization system 104 enables customization of homepages using a generative model to modify the webpage code of the homepages. As shown in FIG. 1, the webpage customization system 104 includes a code generation component 110, a model training component 112, a code validation component 114, a suggestions component 116, and a user interface component 118. The components of the webpage customization system 104 can be in addition to other components that provide further additional functions beyond the features described herein. The webpage customization system 104 can be implemented using one or more server devices, one or more platforms with corresponding application programming interfaces, cloud infrastructure, and the like. While the webpage customization system 104 is shown separate from the user device 102 in the configuration of FIG. 1, it should be understood that in other configurations, some or all of the functions of the webpage customization system 104 can be provided on the user device 102.

In one aspect, the functions performed by components of the webpage customization system 104 are associated with one or more applications, services, or routines. In particular, such applications, services, or routines can operate on one or more user devices, servers, can be distributed across one or more user devices and servers, or be implemented in the cloud. Moreover, in some aspects, these components of the webpage customization system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The code generation component 110 of the webpage customization system 104 leverages a generative model to generate webpage code for a homepage that is customized based on user input. The customizations that can be applied to the homepage can include, for instance, changing what content and features are included on the homepage, as well as the layout, design, appear, and functionality of the homepage.

The homepage can be, for instance, any webpage from a website that provides personalized content for a user. In some aspects, the homepage is a webpage accessed by a user when logging into a website. By way of example and not limitation, the homepage could be a webpage presented to a buyer when accessing an e-commerce site, a webpage presented to a seller to view information regarding the seller's item listings on an e-commerce site, a webpage that presents a seller's item listings on an e-commerce site (e.g., a "storefront"), a webpage accessed by a user on a social media platform, or a webpage accessed by a user from a streaming media website, to name a few. In some aspects, the webpage for a homepage is provided via a server system that includes a frontend and backend services. The frontend serves webpage code for rendering homepages on user devices, such as by the application 108 on the user device 102. The webpage code for the homepages include or otherwise interact with APIs to the backend services, for instance, to retrieve content for presentation on the homepages. The webpage code can also include calls to libraries provided by backend services. The backend services could be a part of the website serving the homepage or third-party services.

The code generation component 110 accesses webpage code for a homepage and a prompt for modifying the homepage. The webpage code and prompt are provided as input to a generative model trained to generate webpage code, as will be described in further detail below. Using the webpage code and the prompt as input, the generative model generates modified webpage code by modifying the webpage code in accordance with the prompt. The modified webpage code can then be provided to a user device, such as the user device 102, which renders the modified webpage code to present a customized homepage, for instance, via the application 108.

The modified webpage code generated by the code generation component 110 can be persisted. For instance, the modified webpage code can be stored in a data store accessible to a web server serving the webpages to users. As such, when a user subsequently visits the website, the modified webpage code is retrieved and provided to the user device.

Figure 2:
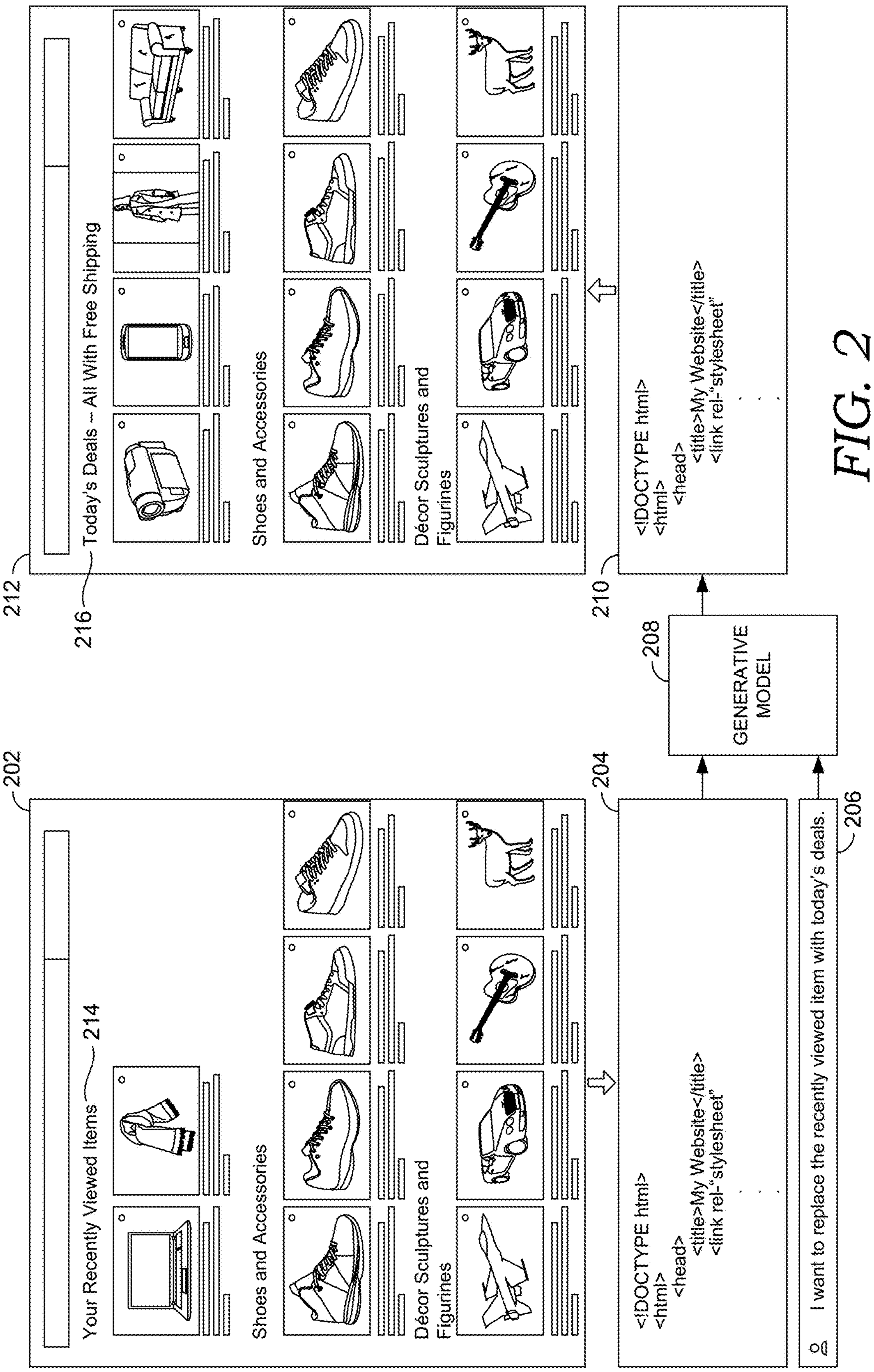
FIG. 2 is a block diagram showing example process of generating modified webpage code using a generative model in accordance with some implementations of the present disclosure.

FIG. 2 is a block diagram illustrating an example operation of the code generation component 110 to generate modified webpage code in accordance with some aspects. As shown in FIG. 2, a homepage 202 is presented on a user device by the user device rendering webpage code 204 provided to the user device by a web server. In this example, the homepage 202 is a webpage from an e-commerce website presented to a buyer when logged into the website. However, this is provided as an example only for illustration purposes. As previously indicated, aspects of the technology described herein can operate using any of a variety of different types of homepages.

Although not shown in FIG. 2, one or more user interface elements are presented to the user to modify the homepage 202. In some aspects, the user interface elements are presented within the homepage 202; while in other aspects, the user interface elements can be provided separately. The user interface elements can comprise a text box or other input feature that allows the user to enter or otherwise select a prompt. In the present example, the user has entered a prompt 206: "I want to replace the recently viewed items with today's deals." It should be understood that the prompt 206 is provided as an example, and the user can enter any prompt that provides an instruction on how to modify the homepage 202 (e.g., "I want my webpage to look as close as possible to user xyz's webpage").

The webpage code 204 for the homepage 202 and the prompt 206 are provided as input to a generative model 208. The generative model 208 has been trained to generate modified webpage code, as will be described in further detail below. Using the webpage code 204 and the prompt 206, the generative model 208 generates modified webpage code 210. The modified webpage code 210 is provided to the user device, which renders the webpage code 210 to present the homepage 212 on the user device. In accordance with the present example of FIG. 2, the generative model 208 generates the modified webpage code 210 by altering the webpage code 204 in a way such that the "Your Recently Viewed Items" 214 are removed and "Today's Deals" 216 are presented in its place.

The code generation component 110 supports an iterative process of customizing a homepage. For instance, a user could submit a first prompt to customize a homepage. Given the first prompt and the webpage code for the homepage, the code generation component 110 generates a first modified webpage code, which is provided to the user device 102 for rendering as a first customized homepage. Upon viewing the first customized homepage, the user could decide to make further changes. Accordingly, the user submits a second prompt to further modify the homepage. The code generation component 110 then generates second modified webpage code, which is provided to the user device 102 for rendering as a second customized homepage. This process can continue for any number of prompts.

The code generation component 110 generates the second modified webpage code using the second prompt and, depending on the context of the second prompt, the initial webpage code or the first modified webpage code. For instance, a user could provide a first prompt: "I want to replace recently viewed items with today's deals." Based on that first input, the generative model generates a first modified webpage code that modifies the initial webpage code to remove "recently viewed items" and to include "today's deals" items. The user could then provide a second prompt: "I don't like that change, let's keep recently viewed items and include trending items instead of today's deals. In that example, the generative model can modify the initial webpage code (as opposed to the first modified webpage code) to generate the second modified webpage code. Alternatively, the user could provide a second prompt: "let's also include trending items after today's deals." In that example, the generative model can modify the first modified webpage code (as opposed to the initial webpage code) to generate the second modified webpage code.

The process of customizing the homepage can include any number of iterations. At each iteration, a prompt is received, and the prompt is provided with some version of the webpage code as input to the generative model 208 to generate further modified webpage code. At each iteration, the further modified code is provided to the user device for rendering the further customized homepage, allowing the user to determine whether to make further modifications.

The generative model used by the code generation component 110 to generate modified webpage code can comprise a language model that includes a set of statistical or probabilistic functions that performs Natural Language Processing (NLP) in order to understand, learn, and/or generate human natural language content. For example, a language model can be a tool that determines the probability of a given sequence of words occurring in a sentence or natural language sequence. Simply put, it can be a model that is trained to predict the next word in a sentence. A language model is called a large language model (LLM) when it is trained on enormous amount of data, resulting in a large model. Some examples of LLMs are GOOGLE's BERT and OpenAI's GPT-3 and GPT-4. These models have capabilities ranging from writing a simple essay to generating complex computer codes-all with limited to no supervision. Accordingly, an LLM can comprise a deep neural network that is very large (billions to hundreds of billions of parameters) and understands, processes, and produces human natural language by being trained on massive amounts of text. These models can predict future words in a sentence letting them generate sentences similar to how humans talk and write. While a language model (e.g., an LLM) is used in some configurations, in other aspects, the generative model can comprise other types of models, such as, for instance, large visual models (e.g., Google Gemini).

In accordance with some aspects, the generative model used by the code generation component 110 to generate webpage code comprises a neural network. As used herein, a neural network comprises at least three operational layers, although a neural network may include many more than three layers (i.e., a deep neural network). The three layers can include an input layer, a hidden layer, and an output layer. Each layer comprises neurons. Different types of layers and networks connect neurons in different ways. Neurons have weights, an activation function that defines the output of the neuron given an input (including the weights), and an output. The weights are the adjustable parameters that cause a network to produce a correct output.

In some configurations, the generative model is a pre-trained model (e.g., GPT-4) that has not been fined-tuned. In other configurations, the webpage customization system 104 includes a model training component 112 that builds the generative model from scratch or fine-tunes a pre-trained model specifically for the task of generating modified webpage code to provide customized homepages. In such configurations, the generative model can be trained or fine-tuned using training data. Because webpage code often leverages APIs and libraries, the generative model can be trained to understand what APIs and libraries are available and how to use those APIs and libraries. The APIs and libraries can be from the website providing the homepage or from a third-party site. As such, the training data can include documentation describing APIs and libraries, as well as other developer resources. The training data can also include examples of webpage code using the APIs and libraries. From this training data, the generative model learns, among other things, how to generate webpage code that properly call APIs and libraries and handle responses.

During training, weights associated with each neuron can be updated. Originally, the generative model can comprise random weight values or pre-trained weight values that are adjusted during training. In one aspect, the generative model is trained using backpropagation. The backpropagation process comprises a forward pass, a loss function, a backward pass, and a weight update. This process is repeated using the training data. For instance, each iteration could include providing API documentation paired example code for the API, generating output code based on the API documentation, comparing (e.g., computing a loss) between the model output and the example code, and updating the model based on the comparison. The goal is to update the weights of each neuron (or other model component) to cause the generative model to generate modified webpage code that supports customizing homepages. Once trained, the weight associated with a given neuron can remain fixed. The other data passing between neurons can change in response to a given input. Retraining the network with additional training data can update one or more weights in one or more neurons.

Because it's possible that the generative model used by the code generation component 110 can generate webpage code with errors (e.g., syntax errors, runtime errors, logical errors, semantic errors, etc.), in some aspects, the webpage customization system 104 includes a code validation component 114. Each time the code generation component 110 generates modified webpage codes, the code validation component 114 performs one or more validation checks on the modified webpage code to determine if it contains any errors. The code validation component 114 can employ any of a number of known techniques for code validation. If an error is detected, the code validation component 114 generates a prompt to correct the error and provides the prompt with the modified webpage code as input to the generative model to cause the generative model to update the modified webpage code to correct the error.

Figure 3:
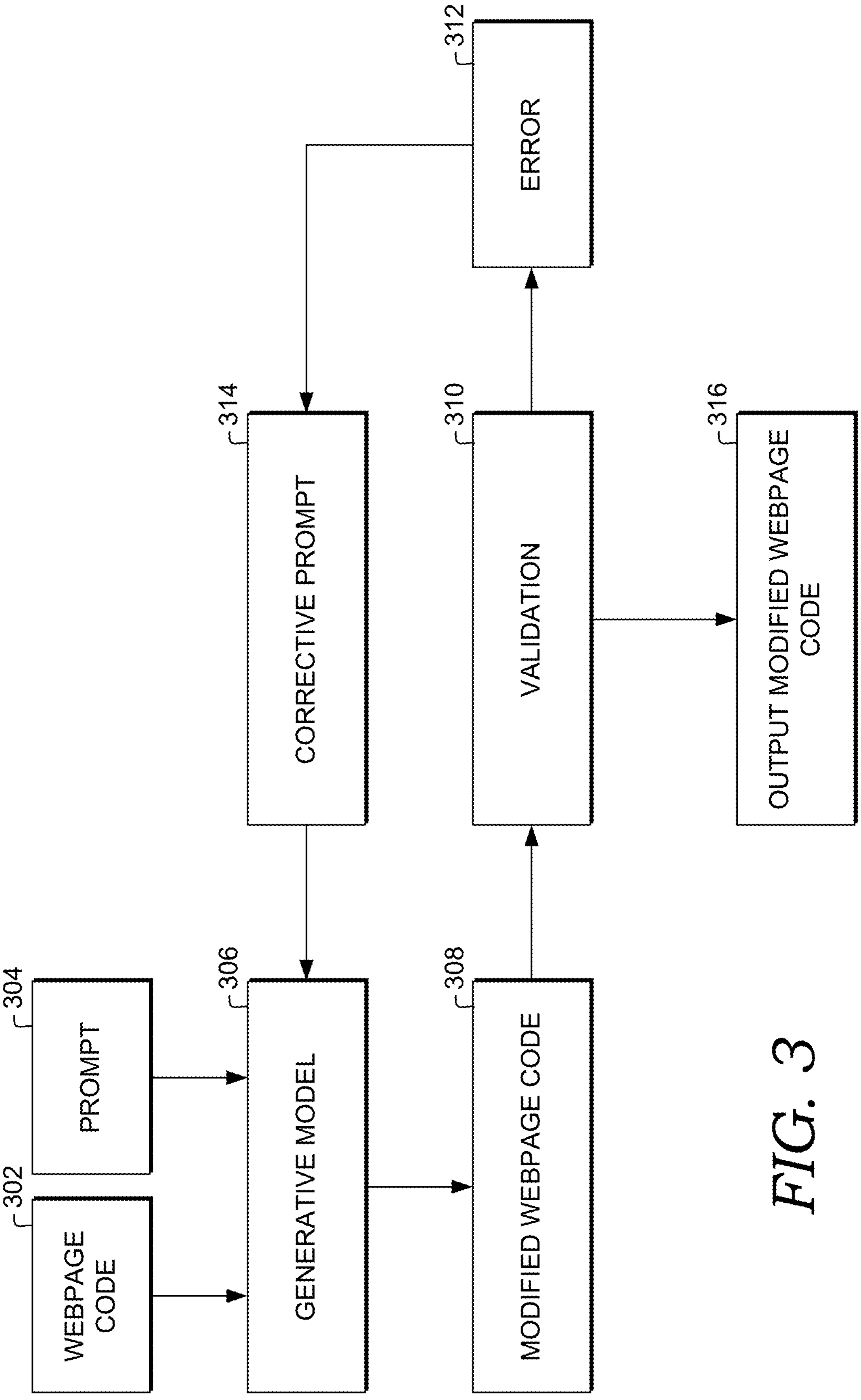
FIG. 3 is a diagram showing an example process of using a generative model to update modified webpage code based on validation checking in accordance with some implementations of the present disclosure.

FIG. 3 is a block diagram illustrating an example interaction of the code generation component 110 and the code validation component 114 to generate, validate, and further update modified webpage code in accordance with some aspects. As shown in FIG. 3, webpage code 302 and a prompt 304 are provided as input to a generative model 306, which generates modified webpage code 308. This could be performed, for instance, by the code generation component 110. The modified webpage 308 is provided for validation 310, which can employ any of a number of known validation techniques to determine if the modified webpage code 308 includes any errors.

In some instances, the validation 310 determines there are no errors in the modified webpage code 308, and the modified webpage code 316 is provided as output for rendering on the user device. In instances in which the validation 310 identifies an error 312 (or multiple errors), a corrective prompt is 314 is generated based on the error 312. In some aspects, the validation 310 outputs a textual summary of the error, which is used to generate the corrective prompt 314. For instance, another generative model could be employed to generate the corrective prompt 314 using the textual description of the error provided by the validation 310. In other aspects, the textual description output by the validation 310 is provided as the corrective prompt 314. In any case, the corrective prompt 314 is provided as input to the generative model 316, which updates the modified webpage code 308 based on the corrective prompt 314. This process of generating modified webpage code and performing a validation on the modified webpage code can be iteratively performed until modified webpage code is generated without errors, at which point the modified webpage code 316 is provided as output.

In some aspects, the webpage customization system 104 supports receiving prompts that comprise text input by a user to customize a homepage. For instance, a text box could be presented to the user allowing the user to enter text for a prompt. FIG. 2 illustrates an example of this in which a user has entered the text "I want to replace the recently viewed items with today's deals." In some further aspects, the webpage customization system 104 includes a suggestions component 116 that provides suggestions to users on ways to customize their homepage and uses prompts based on user-selected homepage customization suggestions. For instance, the suggestions component 116 can provide one or more homepage customization suggestions for presentation to a user, such as: "Would you like to add today's deals to your homepage?" or "Other users have moved their recent orders to the top of their homepage. Would you like to also make this change to your homepage?". When a user selects a particular homepage customization suggestion, the suggestions component 116 determines a prompt for the selected homepage customization suggestion and provides the prompt as input for the code generation component 110 to generate modified webpage code.

The homepage customization suggestions provided by the suggestions component 116 can be identified in a number of different ways within the scope of the technology described herein. In some aspects, the homepage customization suggestions are manually defined. For instance, a system administrator for the website can define one or more homepage customization suggestions to provide to users.

In some configurations, the homepage customization suggestions are determined by analyzing information regarding homepage customizations that users have made using the webpage customization system 104. In such configurations, the suggestions component 116 tracks information regarding homepage customizations made by users and stores the information as historical customization data. The historical customization data can include, for instance, historical prompts entered by users to customize their homepages and the resulting modified webpage code. The suggestions component 116 can also track other data associated with the users making the customizations. For example, in context of a seller modify a homepage, the items the seller is listing can be tracked and associated with their customizations. As such, if a user has a webpage selling a particular item, the suggestions component 116 could suggest changes made by other users also having webpages selling that same item.

The suggestions component 116 can analyze the historical customization data to generate homepage customization suggestions. For instance, the suggestions component 116 can employ NLP techniques to analyze the text of prompts entered by users to determine the homepage customization requested by each prompt. Because many users may request similar customizations, the analysis by the suggestions component 116 also clusters the prompts based on their associated customizations. Any of a variety of known text-based analysis and clustering approaches can be employed by the suggestions component 116, such as, for instance, k-means clustering, DBSCAN (Density-Based Spatial Clustering of Applications with Noise), Latent Semantic Analysis (LSA), Latent Dirichlet Allocation (LDA), and neural network based clustering. In some further aspects, the suggestions component 116 can employ the modified webpage code associated with each prompt to facilitate the clustering. For instance, similar modified webpage code for different prompts can be used to determine that the prompts are similar and should be clustered.

The suggestions component 116 generates a homepage customization suggestion (i.e., the text of the suggestion) for each cluster. In some aspects, the suggestions component 116 generates the text of each homepage customization suggestion using a text-based generative model, which can be a general LLM or an LLM that has been specifically trained to generate text for suggestions based on a cluster of prompts. The suggestions component 116 provides a cluster of prompts to the generative model, which generates the text of a homepage customization suggestion based on the cluster. In further configurations, the suggestions component 116 selects a prompt from a cluster as a representative prompt for the cluster and uses the prompt to provide the homepage customization suggestion for the cluster.

When presenting homepage customization suggestions to a particular user, in some configurations, the suggestions component 116 selects a subset of the homepage customization suggestions to present. In some aspects, the homepage customization suggestions are ranked, and the subset of suggestions are selected for presentation based on the rankings. The rankings can be based on the size of each cluster (e.g., number of prompts) associated with each homepage customization suggestion, as the size of each cluster reflects the frequency with which users have made a certain customization. The suggestions component 116 can also track the number of times each homepage customization suggestion is selected by users and rank the suggestions based on that frequency (alone or in combination with cluster size).

In some configurations, the suggestions component 116 selects one or more homepage customization suggestions to present to a user based on a context of that user's homepage. The context of the homepage includes whether the homepage is the default homepage (i.e., without any customizations) or has been customized by the user. If the homepage has customized by the user, the context can include how the homepage has been customized. As such, different homepage customizations can be selected for presentation based on whether the homepage has been customized or not, and how the homepage has already been customized in the event that customizations have been made. For instance, if a user has already added "today's deals" to their homepage, the suggestions component 116 would not select a homepage customization suggestion to add "today's deals" to the user's homepage.

When a user selects a particular homepage customization suggestion, the suggestions component 116 determines a prompt to provide to the code generation component 110 for generating modified webpage code in accordance with the selected homepage customization suggestion. In some aspects, the selected homepage customization suggestion itself is provided as the prompt.

In other configurations, a predetermined prompt is associated with each homepage customization suggestion. In such configurations, the webpage customization system 104 stores a mapping between each homepage customization suggestion and a corresponding prompt. Accordingly, when a user selects a particular homepage customization suggestion, the suggestions component 116 retrieves, from storage, the predetermined prompt mapped to the selected homepage customization suggestion. In some aspects, the predetermined prompt is provided without modification to the code generation component 110. In other aspects, the predetermined prompt can be dynamically modified prior to providing the prompt to the code generation component 110. For instance, a predetermined prompt could be modified based on a context of the user's homepage.

The predetermined prompt for each homepage customization suggestion can be determined in a number of different ways within the scope of the technology described herein. In some aspects, the predetermined prompt for a homepage customization suggestion is manually defined. For instance, a system administrator could employ prompt engineering to determine an effective prompt for a given homepage customization. In further aspects, a prompt is selected as a representative prompt from a cluster of prompts for a given homepage customization suggestion, and that selected prompt is associated with the homepage customization suggestion. In still further aspects, the suggestions component 116 generates the text of a prompt for a given homepage customization suggestion using a text-based generative model, which can be a general LLM or an LLM that has been specifically trained to generate prompts. The prompt could be generated by providing the cluster of prompts (or a portion thereof) and/or the homepage customization suggestion as input to the generative model, which generates the text of the predetermined prompt from the input.

In still further aspects, the suggestions component 116 dynamically generates a prompt based on the homepage customization suggestion selected by the user and the context of the user's homepage. As noted above, the context of the homepage includes whether the homepage is the default homepage (i.e., without any customizations) or has been customized by the user, and if the homepage has customized by the user, how the homepage has been customized.

The webpage customization system 104 further includes a user interface component 118 that provides one or more user interfaces for interacting with the webpage customization system 104. The user interface component 118 provides one or more user interfaces to a user device, such as the user device 102. In some instances, the user interfaces can be presented on the user device 102 via the application 108, which can be a web browser or a dedicated application for interacting with the webpage customization system 104. Among other things, the user interface component 118 can provide user interfaces for interacting with the webpage customization system 104 to customize homepages. For instance, the user interfaces can comprise one or more user interface elements that allow users to submit prompts for customizing homepages. This can include user interface elements for entering textual prompts or for providing suggestions for user selection.

Figure 4:
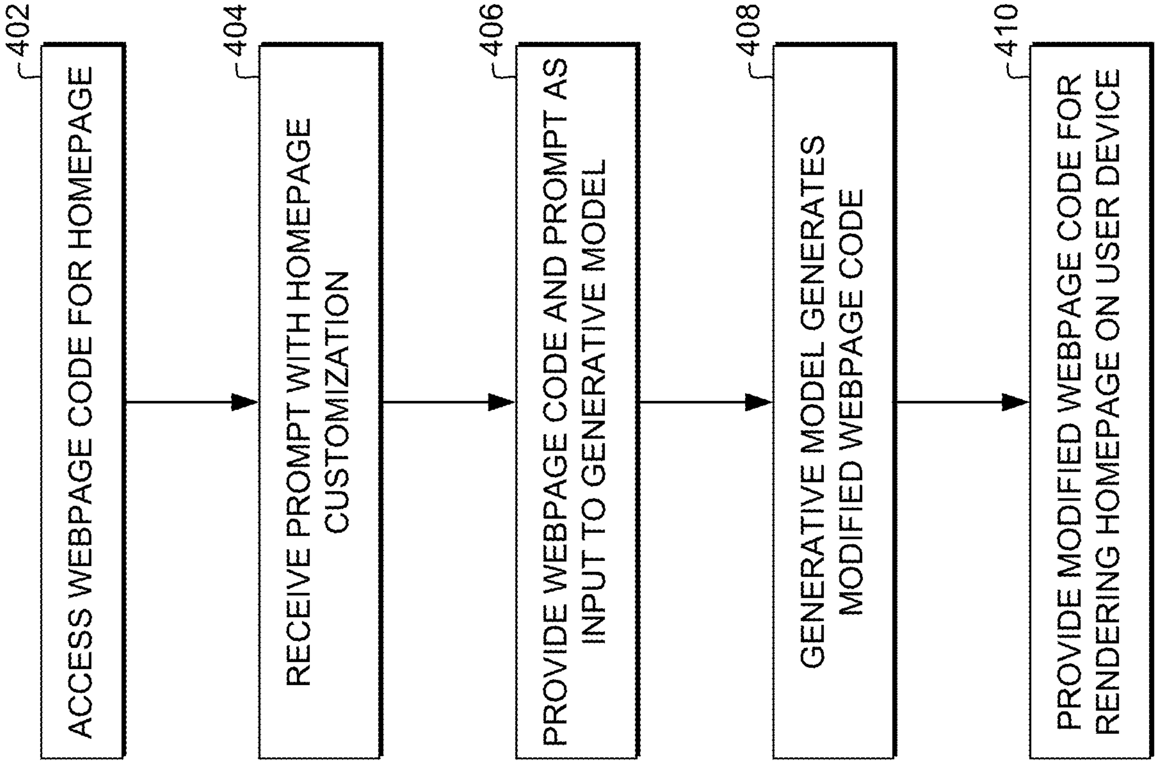
FIG. 4 is a flow diagram showing a method for using a generative model to generate modified webpage code to provide a customized homepage in accordance with some implementations of the present disclosure.

Example Methods for Generating Modified Webpage Code for Customized Homepages With reference now to FIG. 4, a flow diagram is provided that illustrates an overall method 400 using a generative model to generate modified webpage code to provide a customized homepage. The method 400 can be performed, for instance, by the webpage customization system 104 of FIG. 1. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, webpage code for a homepage is accessed. The webpage code can be default webpage code for the homepage or a modified version of the webpage code (e.g., from a previous iteration of customization the homepage).

A prompt for customizing the homepage is received at block 404. In some aspects, the prompt received at block 404 comprises text entered by a user indicating how the user wants to customize the homepage. In other aspects, the prompt is based on a user-selected suggestion. For instance, the system could present one or more suggestions to the user regarding modification of the homepage, and a prompt is received based on a user selection of one of the suggestions.

The webpage code received at block 402 and the prompt received at block 404 are provided as input to a generative model, as shown at block 406. Based on the webpage code and the prompt, the generative model generates modified webpage code, as shown at block 408. The generative model generates the modified webpage code by modifying the webpage code in accordance with the instructions included in the prompt. In particular, the generative model generates the modified webpage code such that when rendered, it provides a homepage customized in accordance with the prompt. As shown at block 410, the modified webpage code is provided to a user device for rendering the customized homepage on the user device (e.g., via a web browser or other application on the user device).

The process of the user submitting a prompt, the generative model generating modified webpage code based on the prompt, and the modified webpage code being provided to the user device for rendering can be repeated any number of times. This allows for an iterative/interactive process in which the user submits different prompts to continue to customize their homepage. In some cases, the submitted prompts can be suggestions from the system. The suggestions provided to the user by the system can be based on the context of other changes.

Figure 5:
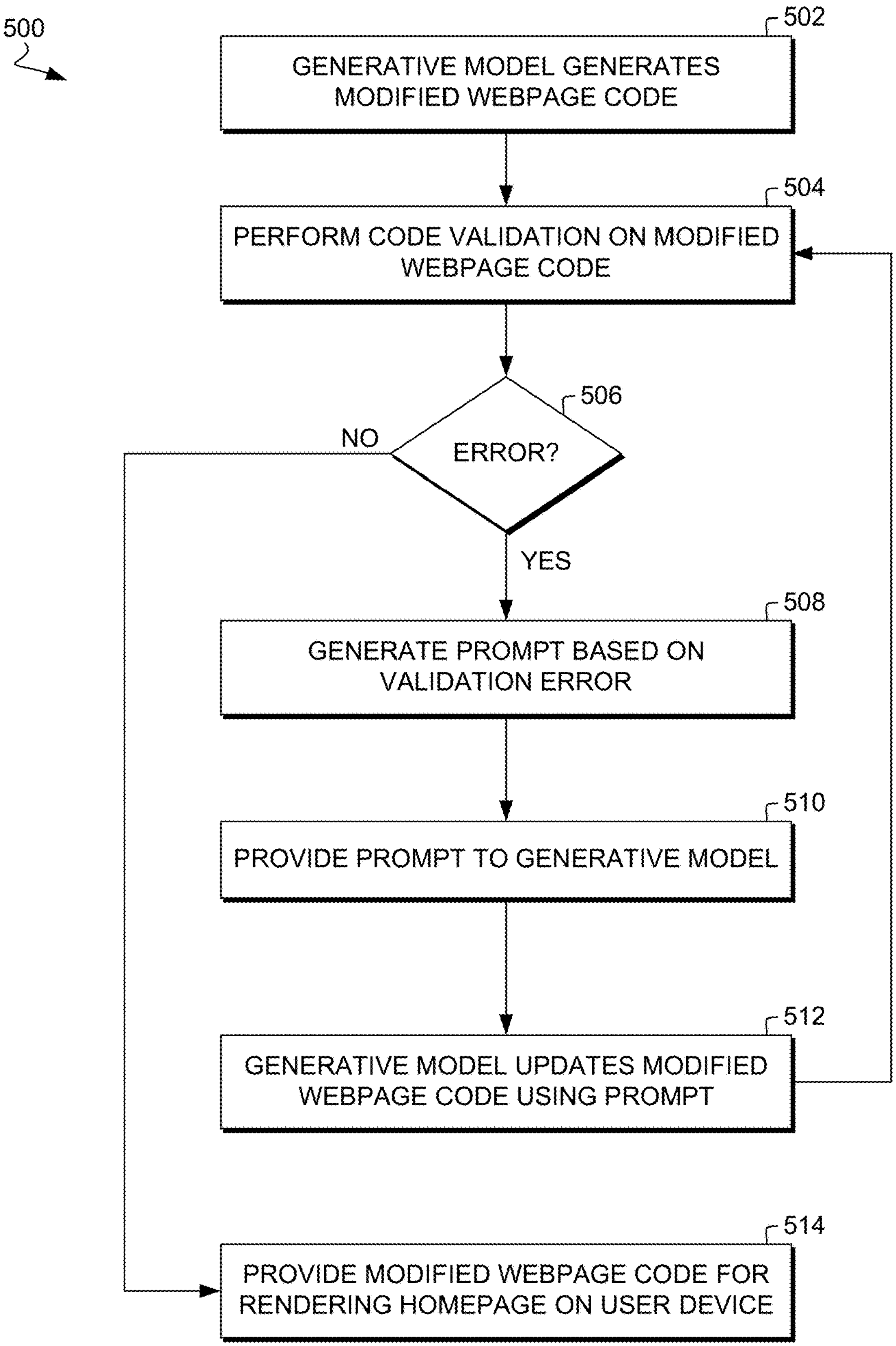
FIG. 5 is a flow diagram showing a method for validating modified webpage code generated in accordance with some implementations of the present disclosure.

With reference next to FIG. 5, a flow diagram showing a method 500 for validating modified webpage code generated in accordance with some aspects of the present technology. The method 500 can be performed, for instance, at least in part by the code validation component 114 of FIG. 1. As shown at block 502, a generative model generates modified webpage code (for instance, via the method 400 described above with reference to FIG. 4). Code validation is performed on the modified webpage code, as shown at block 504. Any of a variety of known validation techniques can be employed to determine whether the modified webpage code includes any errors.

A determination is made at block 506 regarding whether any errors are determined by the code validation process. If no error that warrants updating the modified webpage code is determined at block 506, the modified webpage code is provided for rendering the customized homepage on the user device at block 514. Alternatively, if it is determined at 506 that the modified webpage code includes an error that warrants updating the modified webpage code, a prompt is generated based on the error, as shown at block 508. If multiple errors are detected, one or more prompts are generated at block 508 to correct the errors.

A prompt can be generated in a number of different ways in accordance with the technology described herein. Generally, the code validation process outputs text identifying the detected error. The text outputted by the code validation process can be, for instance, a textual description of the error or an error code. In some aspects, the prompt generated at block 508 is the text output by the code validation process. In other aspects, a prompt with different text is generated based on that text output by the code validation process. For instance, in some configurations, a generative model (which can be specifically trained to generate prompts to correct coding errors) takes the text output by the code validation process as input and generates a prompt comprising text instructing the code generating generative model to update the modified webpage code to correct the error.

The prompt generated at block 508 is provided as input to the generative model, as shown at block 510. The generative model updates the modified webpage code in accordance with the prompt, as shown at block 512. In some aspects, the updated modified webpage code generated at block 512 is checked for errors as shown by the return to block 504. Once the modified webpage code is error-free (at least with respect to errors that warrant updating the modified webpage code), the modified webpage code is provided for rendering the customized webpage on the user device, as shown at block 514.

Figure 6:
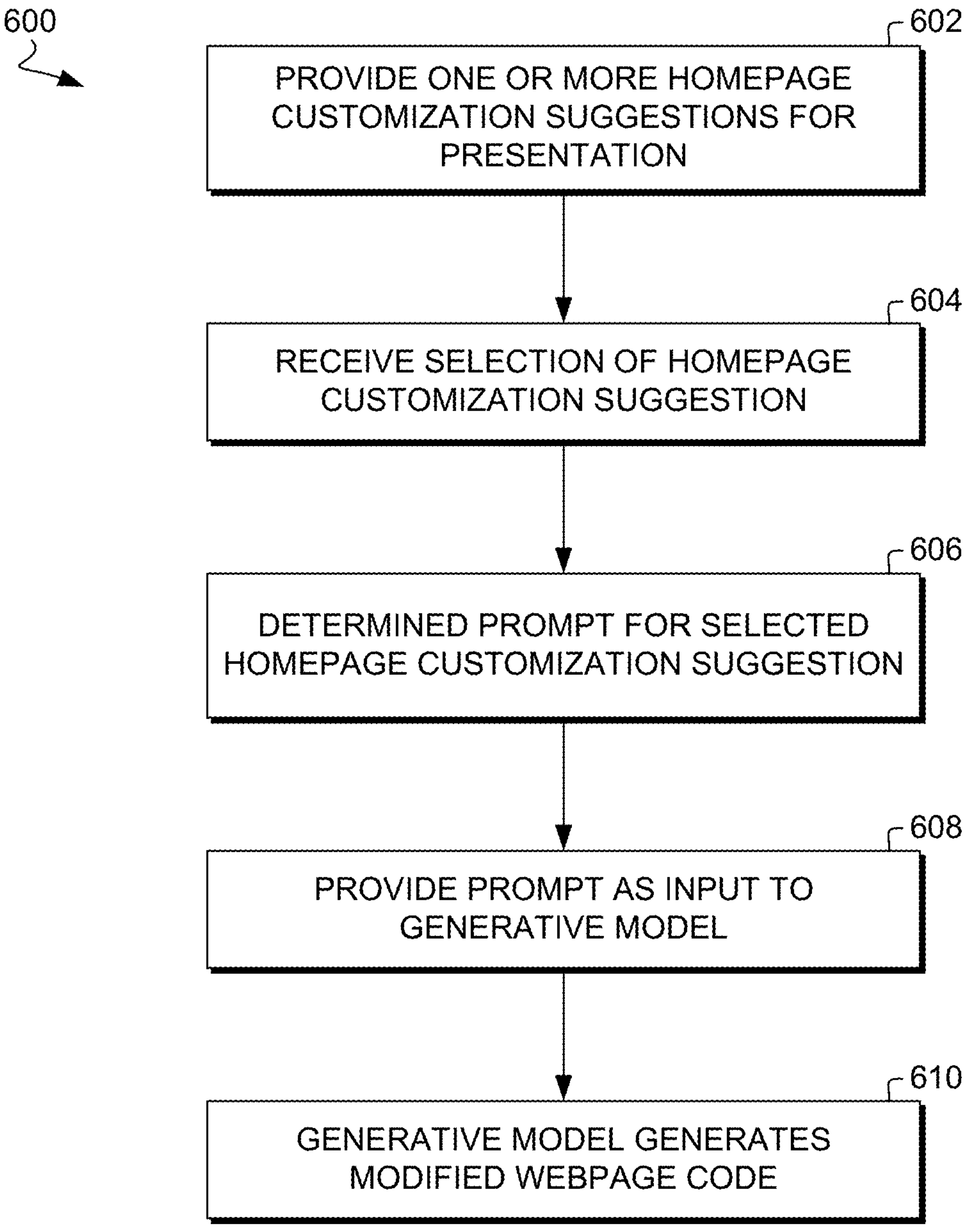
FIG. 6 is a flow diagram showing a method for using suggestions for homepage customization in accordance with some implementations of the present disclosure.

Turning next to FIG. 6, a flow diagram is provided showing a method 600 for using suggestions for homepage customization. The method 600 can be performed, for instance, at least in part by the suggestions component 116 of FIG. 1. As shown at block 602, one or more homepage customization suggestions are provided for presentation on a user device. For instance, when a user is viewing their homepage, the system could provide a message for presentation on the user device with the one or more homepage customization suggestions, allowing the user to review the suggestions and determine whether to customize their homepage based on a customization suggestion.

The one or more homepage customization suggestions presented to the user could be from a set of available homepage customization suggestions that have been, for instance, manually defined (e.g., by a system administrator for the website) or generated (e.g., by the suggestions component 116) via analysis of historical customization data. The homepage customization suggestion(s) to present to the user can be selected from the set of available homepage customization suggestions by ranking the homepage customization suggestions, for instance, based on the historical customization data, frequency of use by other users of the homepage customization suggestions, and/or a context of the user's homepage (e.g., whether the user's homepage has been customized and, if customized, how it has been customized). As an example of the latter, the system could determine from analysis of the current webpage code that the user's homepage does not currently present a particular type of content (e.g., recently purchase items), and the system could provide a homepage customization suggestion to include that type of content.

As shown at block 604, an indication of a user selection of a homepage customization suggestion is received. A prompt is determined based on the selected homepage customization suggestion, as shown at block 606. In some aspects, a mapping of homepage customization suggestions to predetermined prompts is stored, and the prompt is determined by retrieving, from storage, the prompt mapped to the selected homepage customization suggestion. In other aspects, the prompt is dynamically generated based on the selected homepage customization suggestion.

The prompt (along with the webpage code for the homepage) is provided as input to a generative model, as shown at block 608. Based on the webpage code and the prompt, the generative model generates modified webpage code, as shown at block 610. The generative model generates the modified webpage code by modifying the webpage code in accordance with the instructions included in the prompt.

Figure 7:
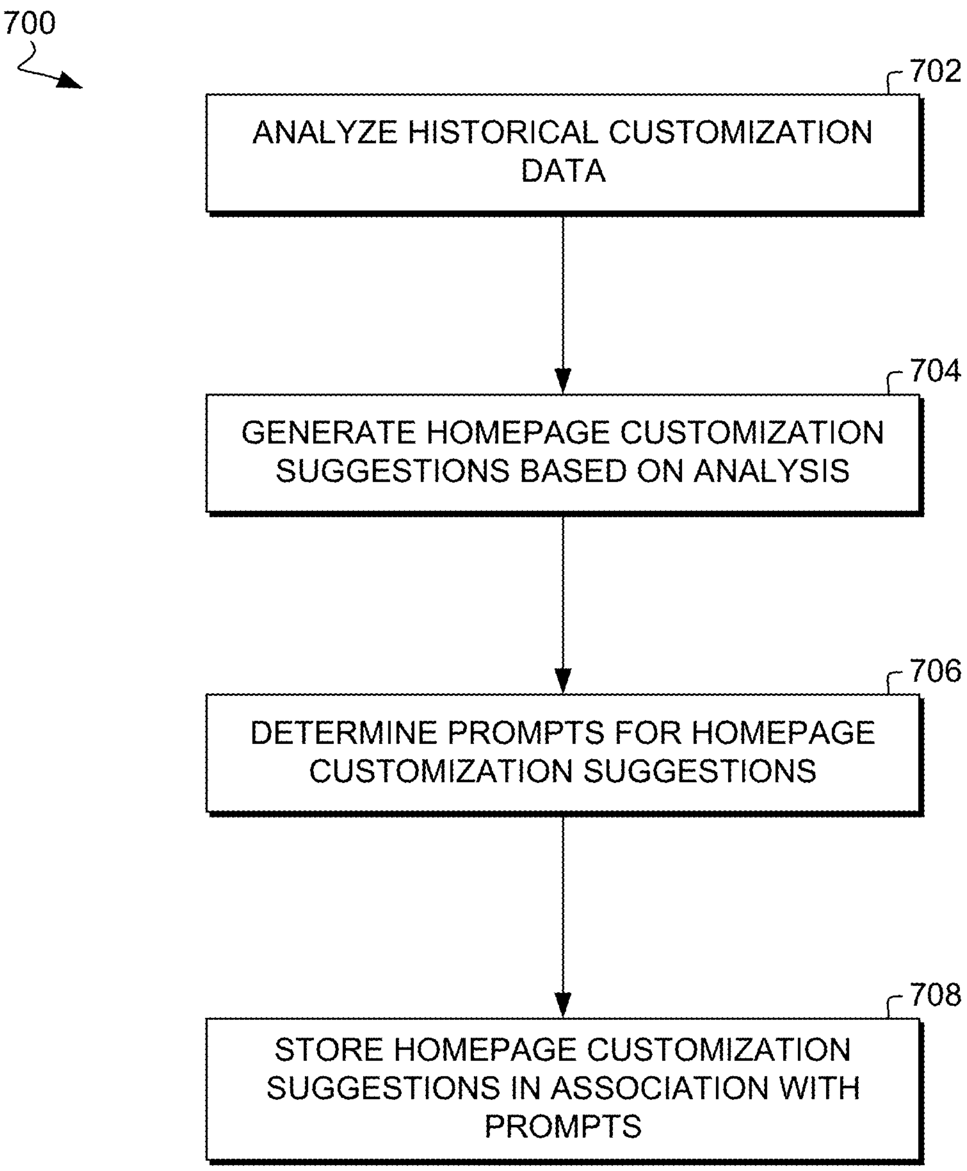
FIG. 7 is a flow diagram showing a method for identifying homepage customizations for generating suggestions in accordance with some implementations of the present disclosure.

FIG. 7 is a flow diagram showing a method for identifying homepage customizations for generating suggestions. The method 700 can be performed, for instance, at least in part by the suggestions component 116 of FIG. 1. As shown at block 702, historical customization data is analyzed, and homepage customization suggestions are generated based on the analysis, as shown at block 704. The historical customization data can include, for instance, prompts entered by users to customize their homepages. In some aspects, the historical customization data can also include the modified webpage code generated using the prompts. In some aspects, NLP and clustering techniques are used to analyze and cluster prompts from the historical customization data, and a homepage customization suggestion is generated for each cluster.

A prompt is determined for each homepage customization suggestion, as shown at block 706, and a mapping is stored between each homepage customization suggestion and its corresponding prompt, as shown at block 708. In some aspects, a prompt is manually defined for a homepage customization suggestion, for instance, by a system administrator for the website using prompt engineering. In some aspects, a prompt is selected as a representative prompt from a cluster of prompts for a homepage customization suggestion, and that selected prompt is associated with the homepage customization suggestion. In further aspects, a prompt is generated based on the homepage customization suggestion and/or the corresponding cluster of prompts, using a text-based generative model.

Exemplary Operating Environment

Figure 8:
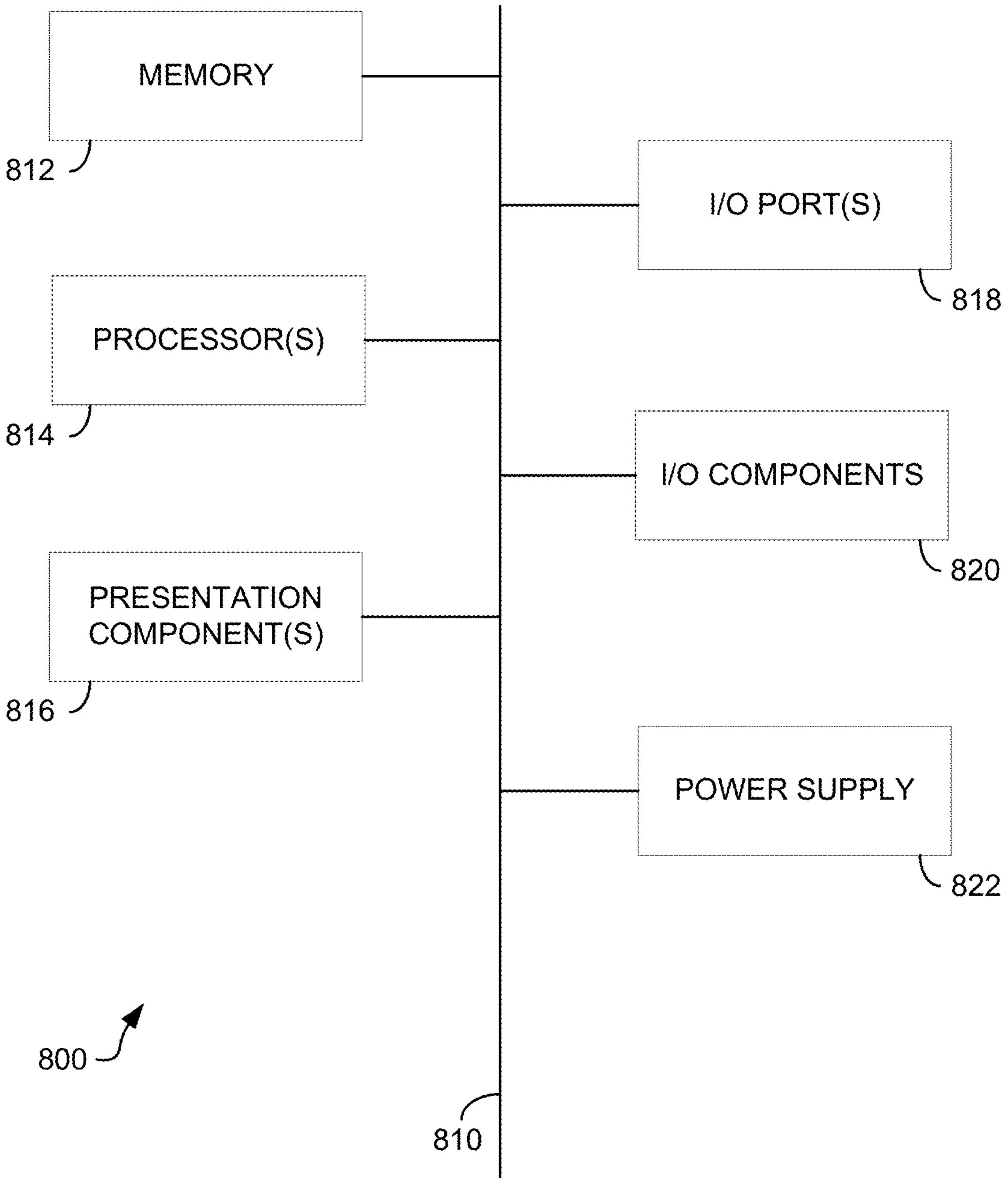
FIG. 8 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 8 in particular, an exemplary operating environment for implementing embodiments of the present technology is shown and designated generally as computing device 800. Computing device 800 is but one example of a suitable computing environment and is not intended to suggest any limitation as to the scope of use or functionality of the technology. Neither should the computing device 800 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what can be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 8 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. The terms "computer storage media" and "computer storage medium" do not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory can be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which can be built in. Illustrative components include a microphone, joystick, game pad, satellite dish, scanner, printer, wireless device, etc. The I/O components 820 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 800. The computing device 800 can be equipped with depth cameras, such as, stereoscopic camera systems, infrared camera systems, RGB camera systems, and combinations of these for gesture detection and recognition. Additionally, the computing device 800 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations, the operations comprising:
- receiving, by at least one of one or more web servers serving webpages for a website, a natural language prompt from a client device, the natural language prompt to modify a homepage of the website to provide a customized homepage;
- accessing, by at least one of the one or more web servers, webpage code for the homepage;
- generating, by at least one of the one or more web servers using a generative model, a modified webpage code using the natural language prompt and the webpage code;
- performing a validation check on the modified webpage code;
- identifying an error in the modified webpage code from the validation check;
- generating a corrective prompt based on the error;
- causing the generative model to update the modified webpage code using the corrective prompt; and
- transmitting, from at least one of the one or more web servers over a network to the client device, the modified webpage code for rendering the customized homepage on the client device.

2. The one or more computer storage media of claim 1, wherein the operations further comprise:
- receiving a second prompt;
- causing the generative model to generate a second modified webpage code using the second prompt and the webpage code or the modified webpage code; and
- transmitting, over the network to the client device, the second modified webpage code for rending a further customized homepage on the client device.

3. The one or more computer storage media of claim 1, wherein receiving the natural language prompt comprises receiving text input by a user on the client device.

4. The one or more computer storage media of claim 1, wherein receiving the natural language prompt comprises:
- providing one or more homepage customization suggestions for presentation on the client device;
- receiving input indicative of a user selection of a first homepage customization suggestion from the one or more homepage customization suggestions; and
- determining the natural language prompt based on the first homepage customization suggestion.

5. The one or more computer storage media of claim 4, wherein determining the natural language prompt based on the first homepage customization suggestion comprises:
- accessing, from storage mapping each of the one or more homepage customization suggestions to a corresponding predetermined prompt, a first predetermined prompt mapped to the first homepage customization suggestion.

6. The one or more computer storage media of claim 5, wherein determining the natural language prompt based on the first homepage customization suggestion further comprises:
- modifying the first predetermined prompt based on a context of the homepage.

7. The one or more computer storage media of claim 4, wherein the one or more homepage customization suggestions are selected from a plurality of homepage customization suggestions, and wherein the plurality of homepage customization suggestions are generated by:

tracking historical customization data comprising a plurality of historical prompts entered by a plurality of other users for webpage customization;

clustering the historical prompts to generate a plurality of clusters; and generating the plurality of homepage customization suggestions using the plurality of clusters.

8. The one or more computer storage media of claim 7, wherein the one or more homepage customization suggestions are selected from the plurality of homepage customization suggestions based on at least one selected from the following: a size of each cluster, frequency information associated with user selections of each homepage customization suggestion, and a context of the homepage.

9. A computer-implemented method comprising:

receiving, by at least one of one or more web servers serving webpages for a website, a natural language prompt from a client device, the natural language prompt to modify a homepage of the website to provide a customized homepage;

accessing, by at least one of the one or more web servers, webpage code for the homepage;

generating, by at least one of the one or more web servers using a generative model, a modified webpage code using the natural language prompt and the webpage code;

performing a validation check on the modified webpage code;

identifying an error in the modified webpage code from the validation check;

generating a corrective prompt based on the error;

causing the generative model to update the modified webpage code using the corrective prompt; and transmitting, from at least one of the one or more web servers over a network to the client device, the modified webpage code for rendering the customized homepage on the client device.

10. The computer-implemented method of claim 9, wherein the method further comprises:

receiving a second prompt;

causing the generative model to generate a second modified webpage code using the second prompt and the webpage code or the modified webpage code; and transmitting, over the network to the client device, the second modified webpage code for rending a further customized homepage on the client device.

11. The computer-implemented method of claim 9, wherein receiving the natural language prompt comprises:

providing one or more homepage customization suggestions for presentation on the client device;

receiving input indicative of a user selection of a first homepage customization suggestion from the one or more homepage customization suggestions; and determining the natural language prompt based on the first homepage customization suggestion.

12. The computer-implemented method of claim 11, wherein determining the natural language prompt based on the first homepage customization suggestion comprises:

accessing, from storage mapping each of the one or more homepage customization suggestions to a corresponding predetermined prompt, a first predetermined prompt mapped to the first homepage customization suggestion.

13. The computer-implemented method of claim 11, wherein the one or more homepage customization suggestions are selected from a plurality of homepage customization suggestions, and wherein the plurality of homepage customization suggestions are generated by:

tracking historical customization data comprising a plurality of historical prompts entered by a plurality of other users for webpage customization;

clustering the historical prompts to generate a plurality of clusters; and generating the plurality of homepage customization suggestions using the plurality of clusters.

14. The computer-implemented method of claim 13, wherein the one or more homepage customization suggestions are selected from the plurality of homepage customization suggestions based on at least one selected from the following: a size of each cluster, frequency information associated with user selections of each homepage customization suggestion, and a context of the homepage.

15. A computer system having one or more web servers serving webpages for a website comprising:

a processor; and a computer storage medium storing computer-useable instructions that, when used by the processor, causes the computer system to perform operations comprising:

receiving, by at least one of the one or more web servers, a natural language prompt from a client device, the natural language prompt to modify a homepage of the website to provide a customized homepage;

accessing, by at least one of the one or more web servers, webpage code for the homepage;

generating, by at least one of the one or more web servers using a generative model, a modified webpage code using the natural language prompt and the webpage code;

performing a validation check on the modified webpage code;

identifying an error in the modified webpage code from the validation check;

generating a corrective prompt based on the error;

causing the generative model to update the modified webpage code using the corrective prompt; and transmitting, from at least one of the one or more web servers over a network to the client device, the modified webpage code for rendering the customized homepage on the client device.

16. The computer system of claim 15, wherein the operations further comprise:

receiving a second prompt;

causing the generative model to generate a second modified webpage code using the second prompt and the webpage code or the modified webpage code; and transmitting, over the network to the client device, the second modified webpage code for rending a further customized homepage on the client device.

17. The computer system of claim 15, wherein receiving the natural language prompt comprises:

providing one or more homepage customization suggestions for presentation on the client device;

receiving input indicative of a user selection of a first homepage customization suggestion from the one or more homepage customization suggestions; and determining the natural language prompt based on the first homepage customization suggestion.

* * * * *